Dec. 30, 1952   G. E. PARKER   2,623,503
CONDITION CONTROL APPARATUS
Filed Aug. 6, 1949   2 SHEETS—SHEET 1

INVENTOR
George E. Parker
By Carlson, Pilgner, Hubbard & Wolfe
ATTORNEYS

Dec. 30, 1952  G. E. PARKER  2,623,503
CONDITION CONTROL APPARATUS
Filed Aug. 6, 1949  2 SHEETS—SHEET 2

INVENTOR
George E. Parker
By Carlson, Pitzner, Hubbard & Wolfe
ATTORNEYS

Patented Dec. 30, 1952

2,623,503

UNITED STATES PATENT OFFICE 2,623,503

CONDITION CONTROL APPARATUS

George E. Parker, Rockford, Ill., assignor to Woodward Governor Company, Rockford, Ill., a corporation of Illinois Application August 6, 1949, Serial No. 109,037

9 Claims. (Cl. 121—42)

This invention relates to apparatus for controlling the energization of a fluid actuated servo in accordance with changes in a control force produced by deviations of a controlled condition from a predetermined value which condition is returned to and held at a steady state value by exerting on the control device a modifying or so-called compensating effect. The invention has more particular reference to systems of the above character in which the fluid servo acts as a relay for controlling the energization of a more powerful primary servo by which the ultimate condition regulator is variably positioned.

One object is to provide a regulating system of the above character incorporating a novel means for varying the compensating force applied to the control device in accordance with changes in the energization of the primary servo as well as the relay servo whereby to stabilize effectually the entire control apparatus and also the regulated apparatus.

Another object is to produce the combined modifying effect above referred to by hydraulically acting means.

A more detailed object is to derive the secondary modifying effect through the action of a piston element exposed to the fluid in the main compensating system and automatically responsive to changes in the position of the regulating member which is actuated by the main servo.

Figure 1:
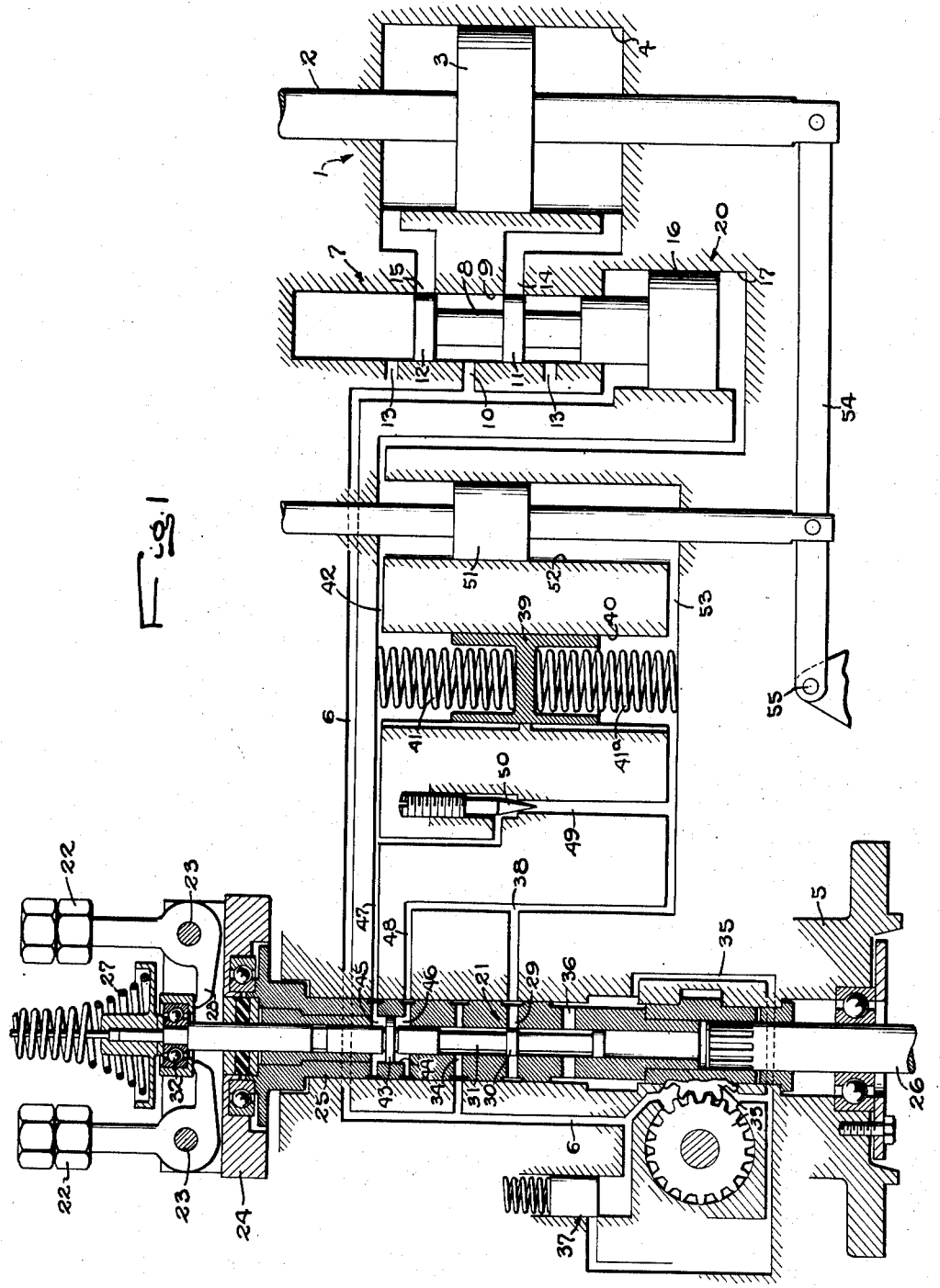

Other objects and advantages of the invention will become apparent from the following detailed description taken in connection with the accompanying drawings, in which Figure 1 is a fragmentary sectional view and hydraulic circuit diagram of a control apparatus.

Figure 2:
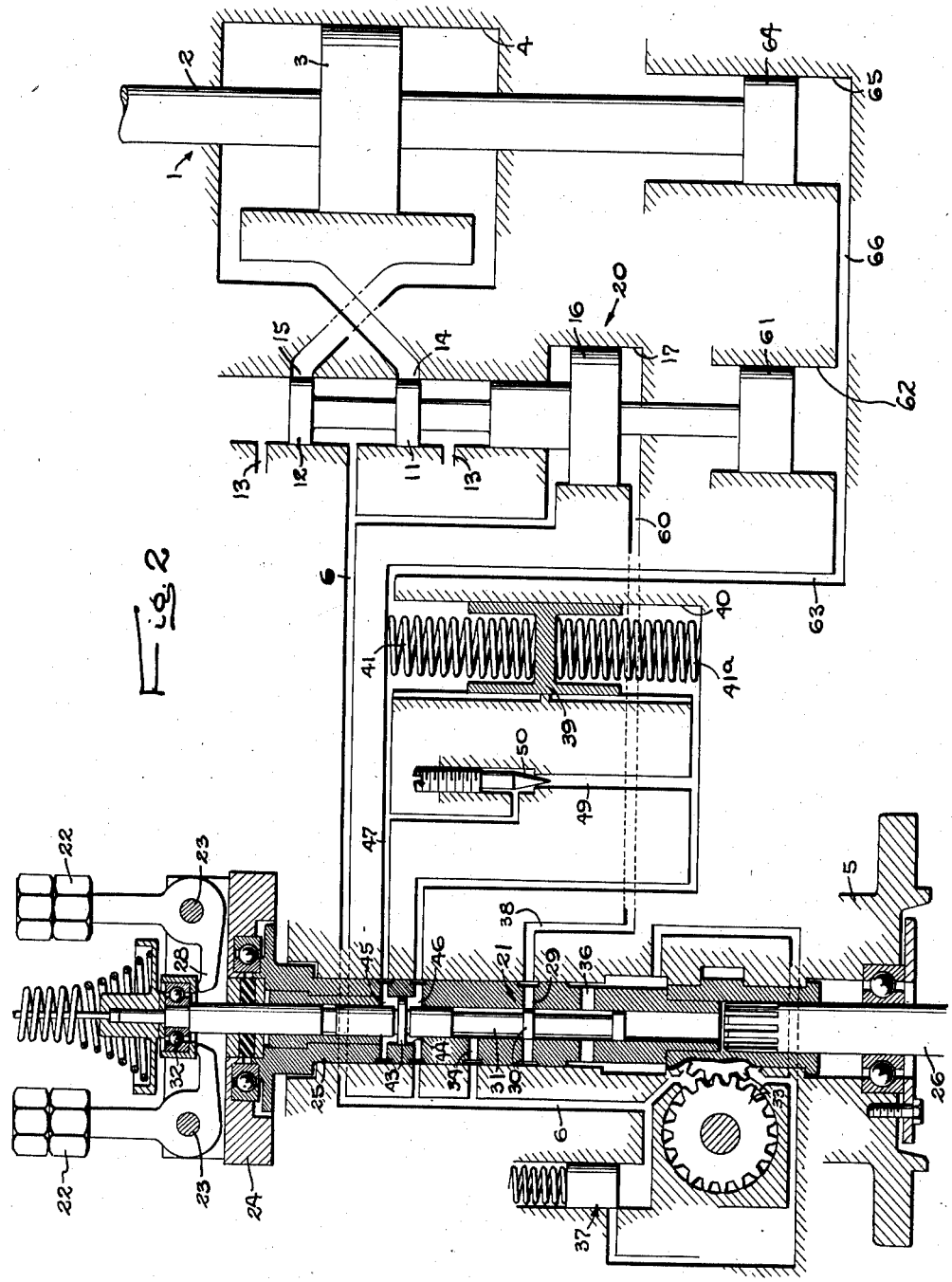

Fig. 2 is a similar view of a modified form of the apparatus.

The improved compensating mechanism is shown in the drawings incorporated in a control apparatus of the hydraulic type in which a signal or control force, variable in direction and magnitude with changes in the physical, chemical or electrical condition, such for example as the speed of a prime mover, governs the operation of a servo actuator 1 for variably positioning a rod 2 which is connected to a condition modifying device, such as the throttle of a prime mover, by which changes in the controlled condition may be made. In the form shown in Fig. 1, the servomotor is of the double acting hydraulic type comprising a piston 3 reciprocable in a stationary cylinder 4 which may, if desired, be mounted on a housing or other suitable support 5 on which the governor proper may also be mounted.

Fluid under pressure in a supply line 6 is admitted to one end or the other of the servo cylinder 4 by a power actuated relay valve 7 which at the same time releases fluid from the other cylinder end. To this end, the valve 7 comprises a plunger 8 slidable in a cylinder 9 and having lands 11 and 12 thereon axially spaced apart on opposite sides of an inlet port 10 communicating with the supply line 6. Beyond the lands 11 and 12, the ends of the cylinder 9 are closed and communicate with drain lines 13. In the neutral position of the valve plunger, the lands 11 and 12 cover ports 14 and 15 leading to opposite sides of the piston 3.

The valve plunger is positioned in accordance with changes in the energization of an auxiliary fluid actuator 20 including a piston 16 on one end of the plunger slidable in a cylinder 17 which is connected at the rod end to the supply line 6. The pressure thus exerted on the smaller piston area is opposed by the pressure in the other end of the cylinder 17 into which fluid is forced or released under the control of a condition responsive control device which preferably takes the form of a pilot valve 21.

Various types of means may be employed to detect deviations of the controlled condition or speed from the value desired to be maintained. The exemplary detecting means herein shown comprises upstanding weights 22 pivoted at 23 on a head 24 which is fast on the upper end of a ported sleeve 25 rotatable in a bushing which is supported in the casing 5. The lower end of the sleeve is spline coupled to a shaft 26 driven by the prime mover which is controlled by the governor. The centrifugal force acting on the flyballs is balanced against a compression spring 27 bearing downwardly against the inner race of a ball thrust bearing 32 whose outer race is engaged by arms 28 of the flyballs. The speed-setting of the governor may be adjusted by manually adjusting an abutment (not shown) engageable with the upper end of the spring.

The control force derived from changes in the flyball speed is applied mechanically to the valve 21, the coacting parts of which are relatively movable in opposite directions with opposite deviations of the control force away from a value predetermined by the governor speed adjustment. Herein, the valve is formed by ports 29 in the sleeve 25 coacting with a land 30 on a stem 31 which is slidable in the rotating sleeve and is connected at its upper end to the inner race of the bearing 32. Above the land 30, the sleeve communicates with the supply line 6 through ports 34. A drain line 35 communicates with the lower end of the sleeve through ports 36.

Fluid at a substantially constant superatmospheric pressure is delivered to the supply line 6 by a pump including gears 33, one of which is coupled to the lower end of the sleeve 25. The pump inlet and outlet are connected respectively to the drain and supply lines 35 and 6 and the pressure in the latter is regulated by a spring loaded by-pass valve 37.

Pressure fluctuations in the space 38 to which fluid is delivered or from which it is released when the valve 21 is open are communicated to the cylinder 17 of the relay valve servo 20 either directly as shown in Fig. 2 or indirectly as shown in Fig. 1. In the latter, a wall in the form of a piston 39 slidable in a cylinder 40 is yieldably urged in opposite directions by compression spring 41 and 41a initially loaded and acting between the piston and opposite ends of the cylinder. One end of the latter is in constant communication with the valve controlled passage 38 and the other end is connected to a passage 42 leading to the servo cylinder 17. The piston 39 has equal effective areas at opposite ends and is yieldably urged in opposite directions so as to be maintained in a centered or neutral position when the pressures in the passages 38 and 42 become equalized.

With this arrangement, it will be apparent that when the pilot valve land 30 is lowered from the neutral position shown in response to a speed decrease below the prevailing speed setting of the governor, fluid from the supply line 6 will flow through the ports 29 into the passage 38 and the connected end of the cylinder 40. The pressure increase therein will move the piston 39 upwardly, overcoming and compressing the spring 41 and forcing fluid out of the other cylinder end through the passage 42 and into the lower end of the servo cylinder 17. The piston 16 and the lands 11 and 12 are thus moved upwardly against the opposing force constantly acting on the other end of the piston. The ports 14 and 15 are uncovered to admit pressure fluid from the supply line to the upper end of the main servo cylinder 4 and release fluid from the lower end. As a result, the piston 3 and the rod 2 are moved downwardly so as to actuate the regulator for increasing the fuel or energy supply to the prime mover. As a result of the displacement of the piston 16, the pressures in the cylinder 40 on the opposite ends of the piston 39 will differ from each other by an amount determined by the area of the piston and the difference between the loads on the springs 41 and 41a at the new position of the piston.

Similarly, a detected rise in speed causes the valve land 30 to be raised above the valve ports 29. This allows fluid to escape to the drain or return line from the passage 38 thereby decreasing the pressure in the latter by an amount corresponding to the speed deviation. Such pressure reduction allows the piston 39 to move under the higher pressure existing in the servo cylinder 17 thereby compressing the spring 41a and allowing the servo piston 16 to move downwardly under the action of its spring 18. Again there is created a differential between the pressures in the servo cylinder and the valve passage 38, the former being greater than the latter by an amount determined by the area of the piston and the loading of the springs at the new piston position.

Such lowering of the relay valve plunger connects the upper end of the main servo cylinder to the drain line 13 and admits pressure fluid through the port 14 to the lower end of the cylinder. The piston 3 is thus moved upwardly to cause the regulator to decrease the energy supply to the prime mover.

It will be apparent from the foregoing that during normal operation of the speed controller, superatmospheric pressures are maintained at all times in the lower end of the servo cylinder 17 and in the valve outlet passage 38 and that in response to any speed change, there is a pressure difference between these two spaces, the differentials being in opposite senses depending on whether the speed rises above or falls below the governor setting. These pressure differentials may be utilized to advantage in producing a so-called compensating action, that is, a force acting to restore the valve elements to their neutral position and thus produce a drooping characteristic which is then dissipated gradually until normal speed has been restored under the changed load.

The modifying force may be applied to either element of the control device 21 by providing on such element oppositely facing pressure areas respectively subjected to the pressures in the valve space 38 and the servo passage 42. Herein, these areas are formed by opposite sides of a movable wall in the form of a piston 43 secured to the valve stem 31 above the valve structure. The piston is slidable in a cylinder 44 formed within the rotating sleeve 25 and closed on its upper end by a bushing so as to form a chamber 45 above the piston and a chamber 46 of similar size below the piston, the opposite ends of the piston having equal effective pressure areas so that the fluid operator by which the modifying force is applied will be equally effective in opposite directions.

To exert the pressure differentials above referred to on the piston 43 and in the proper direction, the upper chamber 45 is connected by a passage 47 to the passage 42 that leads to the auxiliary servo cylinder 17. The valve outlet passage 38 is directly connected to the lower chamber 46 through a passage 48. As a result of these connections, the piston 43 and the stem 31 will receive a resultant upwardly directed force following downward movement of the valve stem in response to the detection of a speed decrease. As described above, this force is due to the predominance in the pressure change in the passage 38 and the lower chamber 46 over that in the servo cylinder 17 and in the upper chamber 45. Conversely, when fluid is released from the passage 38 in response to a speed increase, the pressure in both chambers 45 and 46 changes, but that in the upper chamber predominates resulting in the application of a downward force on the receiving piston 43.

In each case, the modifying force on the piston 43 urges the valve stem in a direction opposite to its movement which produced the pressure differential, thereby producing the desired drooping characteristic. Since the restoring force is derived directly from the pressure differential that produces the motion of the servo piston 16, the force will be proportional to the movements of the servo piston and the spring loaded piston 39.

To apply the restoring force on the valve only temporarily and thus enable the controlled condition to be returned to the steady state or equilibrium value, means is provided for decreasing the return force progressively by dissipating the pressure differential which produces it. This is accomplished by interposing between the passages 38 and 47 a connection 49 having a restriction therein of a size determined by the setting of a needle valve 50 which may be adjusted to vary the rate of fluid leakage between the servo cylinder 17 and the valve outlet passage 38.

For any given rate of leakage through the needle valve 50, the magnitude of the restoring force for a given amount and rate of servo movement will be determined by several factors including the area of the pistons 16, 39 and 43, and the scale of the springs 41 and 41ᵃ. These factors are, of course, correlated with each other to produce the desired compensating action. Also, suitable means (not shown) is provided for sealing the chambers 45 and 46 against the escape of pressure fluid.

The operation of the compensating mechanism above described may be summarized as follows, assuming that the controlled prime mover is operating at the speed for which the governor is set, the parts then being in the equilibrium positions shown in Fig. 1. If the load on the prime mover is increased and the speed thereby decreased, the flyball force decreases, allowing the speeder spring 27 to move the control land 30 downwardly to a new equilibrium position thereby uncovering the ports 29 and permitting a flow of pressure fluid to the passage 38 and the lower end of the cylinder 40 forcing the piston 39 upwardly against the action of the spring 41. Fluid is thus forced out of the other end of the cylinder and into the servo cylinder 17 causing the relay valve to change the energization of the main servo in a direction to correct for the speed decrease.

As an incident to this, the pressure in the lower chamber 46 is increased above that in the upper chamber 45 by an amount proportional to the servo movement, resulting in the application to the receiving piston 43 of an upwardly directed restoring force. The drooping characteristic thus produced is maintained by the action of the spring 41 on the piston 39 but starts to dissipate immediately by fluid leakage through the restricted bypass 49 between the chambers 45 and 46. As the pressure differential decreases, the speed at which a given opening of the valve 21 is maintained is brought closer to the normal speed setting of the governor until the normal speed has been restored fully when the pressure differential has been dissipated and the piston 39 returned to balanced position, the system then being in equilibrium.

If the load decreases resulting in a speed increase, the valve land 30 is raised by the flyballs and the energization of the servo is reduced as above described by movement of the piston 39 in the downward direction against the action of the spring 42. A pressure differential is thus created between the chambers 45 and 46 resulting in a force applied to the receiving piston 43 in a downward direction. As before, the droop thus produced is dissipated by the leakage through the needle valve, the normal speed of the prime mover being restored when equilibrium again obtains with the return of the buffer piston 39 to balanced position.

It will be observed that the compensating effect described above is derived as an incident to changes in the energization of the auxiliary or relay valve servo 20 as distinguished from the main regulating servo 1. To stabilize the regulating action of the latter, it is desirable to apply to the primary control device or valve 21 a supplementary modifying effect which is derived from changes in the energization of the main servo and acts on the primary control device in the same direction as the compensating effect first described and is dissipated gradually in a similar way. In accordance with the present invention, this supplementary modifying force is derived hydraulically as an incident to a change in the position of the main servo piston 3 and is applied to the control device by varying the fluid pressure in the compensating system above described.

Accordingly, in the form shown in Fig. 1, the motion of the main servo piston 3 is connected to a piston 51 interposed in the fluid compensating system in parallel with the piston 39 and operating to displace fluid within the cylinder 40 in accordance with changes in the position of the servo piston whereby to move the piston 39 creating a further difference in pressure between the chambers 45 and 46 so as to supplement the force exerted on the receiving piston 43 by the pressure differential first described above. For this purpose, the piston 51 is slidable in a cylinder 52 connected at one end to the passage 42 and at the other end to the valve control passage 38 through a passage 53. The piston rod projects through opposite end walls of the cylinder 52 and the lower end is pivotally connected intermediate the ends of a lever 54 which is fulcrumed at one end at 55 and at the other end is connected to one end of the regulator rod 2.

With the piston thus connected, downward or speed increasing motion of the servo piston 3 which results, as above described, from the detection of a speed decrease by the governor, swings the lever 54 downwardly and imparts a corresponding but lesser movement to the piston 51. This further increases the pressure in the valve controlled space 38 and in the lower chamber 46 thereby correspondingly increasing the upwardly acting force on the compensating receiving piston 43. This supplemental modifying force acts in the same direction as the primary modifying force which as above described follows each fall in speed below the predetermined value.

Following the detection of a speed increase, a reverse action takes place. This is accompanied as above described in lowering of the buffer piston 39 and the creation of a pressure differential between the chambers 45 and 46 which acts downwardly on the piston 43, and opening of the relay valve 7 in a direction to raise the main servo piston 3. The latter motion raises the piston 51 thus increasing the fluid pressure in the chamber 45 in relation to that in the chamber 46 thus increasing the compensating force applied to the piston 43.

In both instances described above, the supplemental energy imparted to the compensating system by the action of the piston 51 is stored in one of the buffer springs 41 and 41ᵃ and therefore is utilized by the subsequent leakage of fluid through the needle valve 50 to effect gradual dissipation of the supplemental compensating effect in the same manner that the primary compensating force is decreased. The effective areas of the piston 51 and the mechanical advantage of the lever 54 are of course correlated with the other elements of the compensating system so that the supplemental compensating force produces the desired action stabilizing the operation of the main servo 1.

The supplemental compensating effect may be produced in a similar manner in other kinds of regulating apparatus embodying primary compensating systems of the fluid type. Such a system is shown in Fig. 2 in which the parts common to the system previously described are numbered correspondingly. In this system, the passage 38 which is controlled by the pilot valve 21 communicates directly through a passage 60 with the lower end of the cylinder 17 of the auxiliary or relay valve servo. The upper end of this cylinder is connected directly to the supply line 6. As before, the two compensating chambers 45 and 46 are connected through a by-pass connection 49 having the needle valve restriction 50 therein and are similarly connected to opposite ends of the cylinder 40 in which the piston 39 is normally centered by the springs 41 and 41a.

In this system, the differential fluid pressure between the chambers 45 and 46 is achieved by connecting the lower chamber 46 directly to the supply line 6 and increasing or decreasing the pressure in the upper chamber 45 relative to the supply pressure in accordance with changes in the position of the relay servo piston 16. To the latter end, a piston 61 is formed on the end of the piston rod opposite the valve plunger and slides in a cylinder 62 which is connected by a passage 63 to the passage 47 leading to the chamber 45. Thus, as the piston 61 moves downwardly with the servo piston 16, the fluid pressure in the chamber 45 is increased above the constant pressure in the chamber 46 and a downwardly directed compensating force is exerted on the pilot valve. Conversely, as the piston 16 is raised following the detection of a decrease in speed, the piston 61 acts to decrease the pressure in the chamber 45 below that in the chamber 46 causing an upwardly directed compensating force to be exerted on the stem of the pilot valve.

In a similar way, the speed increasing and speed decreasing movements of the main servo piston 3 are converted into supplemental changes in the pressure in the compensating system. For this purpose, a piston 64 carried by the extended end of the rod 2 slides in a cylinder 65 which communicates through a passage 66 with the passage 63. In response to lowering of the main servo piston 3 following detection of a speed increase, the pressure in the chamber 45 is, by downward movement of the piston 64, increased relative to the constant pressure in the chamber 46. As a result, a pressure differential is created and a downwardly directed compensating force is applied to the pilot valve stem.

Summarizing the operation of the system shown in Fig. 2, the detection of a decrease in speed with the parts in equilibrium positions results in lowering of the pilot valve stem 31. Fluid from the supply line 6 is thus admitted to the passage 38 and the cylinder 17 causing the relay valve to be shifted in a direction to admit pressure fluid to the lower end of the cylinder 4 thus raising the main servo piston 3 and the control rod 2 to increase the fuel supply or the prime mover speed. This motion of the piston 61 causes a pressure reduction in the chamber 45. The constant supply pressure in the chamber 46 then acts on the piston 43 to restore the valve stem to neutral position and also to shift the piston 39 and compress the spring 41. The energy thus stored and the compensating force are dissipated gradually by leakage through the valve 50. This primary compensating effect is accompanied by a similar supplemental effect produced as above described by the corresponding motion of the piston 64 which moves with the main servo piston 3.

In response to a speed increase, the pilot valve stem is lowered releasing pressure fluid from the cylinder 17 and allowing the relay valve piston 16 to lower under the constant pressure acting on the upper end thereof. This is accompanied by lowering of the main servo piston 3 to increase the fuel supply to the prime mover. The downward motions of the two pistons 61 and 64 compress the fluid in the passage 63 and the upper chamber 45 thus producing a pressure differential opposing the control force change and restoring the valve stem temporarily to neutral position. This is accompanied by compression of the spring 41a and the storing of energy which is dissipated gradually by leakage through the valve 50 causing the restoring force to be decreased correspondingly.

I claim as my invention:

1. Regulating apparatus having, in combination, means providing a fluid filled space, means providing a source of fluid under pressure, a control device governing the flow of the pressure fluid to and from said space and having parts relatively movable in opposite directions away from a normal neutral position in response to opposite deviations of a control force from a predetermined value, a main fluid servo including a member variably movable in accordance with the degree of pressure energization of the servo, an auxiliary fluid pressure servo, a valve actuated by said auxiliary servo according to the degree of fluid pressure energization thereof and controlling the admission of pressure fluid to or the release thereof from said main servo, an element movable with one part of said control device and having oppositely facing pressure areas of equal size, means coacting with the respective pressure areas to define fluid filled chambers, mechanism including fluid connections between said space, said auxiliary servo, and said chambers and operable to vary the energization of the auxiliary servo in accordance with changes in the pressure in said space and also to produce a differential in pressure between said chambers in a direction to move said element and restore said control parts to said neutral position, means yieldably resisting the building up of said differential in either direction, means establishing continuous restricted communication between said chambers for effecting gradual dissipation of said pressure differential and normal equalization of the pressures in said chambers, a second element movable in opposite directions and having oppositely facing pressure areas of equal size, means enclosing the respective pressure areas on said second element and subjecting the same to fluid pressure changes in said chambers, and a connection between said servo member and said second element operable to transmit the motion of the member to the element in a direction to produce between said chambers a pressure differential acting on said first element in the same direction as said first mentioned pressure differential.

2. Regulating apparatus having, in combination, means providing a fluid filled space, means providing a source of fluid under pressure, a control device governing the flow of the pressure fluid to and from said space and having parts relatively movable in opposite directions away from a normal neutral position in response to opposite deviations of a control force from a predetermined value, a main fluid servo including a member variably movable in accordance with the degree of pressure energization of the servo, an auxiliary fluid pressure servo, a valve actuated by said auxiliary servo according to the degree of fluid pressure energization thereof and controlling the flow of pressure fluid to vary the energization of said main servo, a reversible fluid actuator variably energizable to modify the action of said control device, mechanism including fluid connections between said space, said auxiliary servo, and said actuator and operable to vary the energization of the auxiliary servo in accordance with changes in the pressure in said space and also to energize said actuator to produce a force acting to restore said control parts to said neutral position, means including a fluid restriction for effecting gradual dissipation of the energization of said actuator, a piston element subjected to the fluid pressure energizing said actuator, and a connection between said servo member and said piston element operable to transmit the motion of the member to the element in a direction to increase the energization of said actuator.

3. Regulating apparatus having, in combination, a control device governing the flow of the pressure fluid to and from said space and having parts relatively movable in opposite directions away from a normal neutral position in response to opposite deviations of a control force from a predetermined value, a main fluid servo including a movable piston, an auxiliary fluid pressure servo selectively energizable under the control of said device, a valve actuated by said auxiliary servo and controlling the admission of pressure fluid to said main servo, a member movable with one part of said control device and having oppositely facing pressure areas of equal size, means coacting with the respective pressure areas to define fluid filled chambers, fluid connections operable as an incident to a change in the energization of the auxiliary servo to produce between said chambers a difference in pressure acting on said areas in a direction to restore said control parts to said neutral position, means yieldably resisting the building up of said differential in either direction and effecting gradual dissipation thereof, a movable piston subjected to pressure changes in said connections, and a connection communicating the movements of said servo piston to said last mentioned piston in a direction to increase said pressure differential.

4. Regulating apparatus having, in combination, a control device having parts relatively movable in opposite directions away from a normal neutral position, a member movable with one of said parts and having opposite effective pressure areas of equal size, means coacting with the respective pressure areas to define closed fluid filled chambers, a hydraulic system operable selectively according to the direction of displacement of the control device out of said neutral position to change the pressures in both of said chambers differentially and produce a resultant pressure differential acting to urge said device toward the neutral position, a fluid servo actuator energized selectively in accordance with fluid pressure changes in said hydraulic system, means establishing continuous restricted communication between said chambers for effecting gradual dissipation of said pressure differentials and equalizing the pressures in the chambers, a fluid servo having a movable piston, a valve actuated by said fluid actuator to admit pressure fluid to or release the same from said servo, a fluid filled cylinder communicating at opposite ends with respective ones of said chambers, a piston element slidable in said cylinder and having oppositely facing areas of equal size, and a connection disposed exteriorly of said servo and said cylinder and operable to transmit the motion of said piston to said piston element in a direction to increase said pressure differential.

5. Regulating apparatus having, in combination, a control device having parts relatively movable in opposite directions away from a normal neutral position, a wall movable with a part of said control device and having opposite effective pressure areas of equal size, means coacting with the respective pressure areas to define closed fluid filled chambers, fluid pressure actuated means operable selectively according to the direction of displacement of the control device out of said neutral position to change the pressures in both of said chambers differentially and produce a resultant pressure differential acting to urge said device toward the neutral position, a fluid servo actuator energized selectively in accordance with fluid pressure changes in said fluid pressure actuated means, means establishing continuous restricted communication between said chambers for effecting gradual dissipation of said pressure differentials and equalizing the pressures in the chambers, a fluid servo having a movable piston, a valve actuated by said actuator to admit pressure fluid to or release the same from said servo, a fluid filled cylinder communicating at opposite ends with respective ones of said chambers, a piston element movable in said cylinder and having oppositely facing pressure areas of equal size, and a connection for transmitting the motion of said servo piston to said piston element in a direction to increase said pressure differential.

6. Regulating apparatus having, in combination, a control device having parts relatively movable in opposite directions away from a normal neutral position, a member movable with a part of said control device and having opposite effective pressure areas, means coacting with the respective pressure areas to define closed fluid filled chambers, a hydraulic system operable selectively according to the direction of displacement of the control device out of said neutral position to change the pressures in both of said chambers differentially and produce a resultant pressure differential acting to urge said device toward the neutral position, said differential thereafter being dissipated gradually, a fluid servo actuator energized selectively in accordance with fluid pressure changes in said system, a main fluid servo having a movable piston, a valve actuated by said actuator and controlling the energization of said servo, a fluid filled cylinder having a piston element therein and communicating at opposite ends with respective ones of said chambers, and a connection for transmitting the motion of said servo piston to said piston element in a direction to increase said pressure differential.

7. Regulating apparatus having, in combination, a main fluid servo having a movable member, an auxiliary fluid servo, a valve actuated by the latter servo to vary the energization of said main servo, a condition responsive valve controlling the flow of pressure fluid to and from said auxiliary servo, a hydraulic system operative as an incident to a change in the energization of said auxiliary servo to impart to said condition responsive valve a compensating force which is dissipated gradually and which acts in a direction to urge the latter valve towards a neutral position, a separate piston exposed to the fluid in said system, and a connection for transmitting the motion of said main servo member to said piston in a direction to augment said compensating force.

8. Regulating apparatus having, in combination, a control device having parts relatively movable in opposite directions away from a normal neutral position in response to opposite deviations of a control force from a predetermined value, a main power servo including a movable driven member, an auxiliary power servo selectively energizable under the control of said device, a second control device actuated by said auxiliary servo and controlling the selective energization of said main servo, a compensating system including an element movable with one part of said first control device, means operable as an incident to a change in the energization of the auxiliary servo to apply to said element a compensating force urging said control parts to said neutral position, means yieldably resisting the building up of said force in either direction and effecting gradual dissipation thereof, and mechanism for converting the movements of said driven member into a supplemental force of corresponding magnitude and for applying such supplemental force to said element in a direction to augment said compensating force.

9. Regulating apparatus having, in combination, a control device having parts relatively movable in opposite directions away from a normal neutral position, a member movable with a part of said control device, a compensating system operable selectively according to the direction of displacement of the control device out of said neutral position to apply a compensating force to the device acting to urge the device toward the neutral position, a servo actuator energized selectively in accordance with changes in the position of said device, a main servo having a movable driven element, a second control device actuated by said actuator and controlling the energization of said main servo, and mechanism for producing a modifying force corresponding in magnitude and proportional in magnitude to the displacement of said servo element and operable to apply such force to said first control device in a direction to augment said compensating force.

GEORGE E. PARKER.

REFERENCES CITED

The following references are of record in the file of this patent:

UNITED STATES PATENTS

| Number | Name | Date |
| --- | --- | --- |
| 2,478,183 | Drake | Aug. 9, 1949 |
| 2,478,752 | Drake | Aug. 9, 1949 |
| 2,478,753 | Parker | Aug. 9, 1949 |